United States Patent [19]

Vaughan

[11] 4,440,357
[45] Apr. 3, 1984

[54] MANDREL AND CORE ASSEMBLY FOR LARGE FORMAT CAMERAS

[75] Inventor: Quentin D. Vaughan, Hollywood, Fla.

[73] Assignee: Visual Graphics Corporation, Tamarac, Fla.

[21] Appl. No.: 398,686

[22] Filed: Jul. 15, 1982

[51] Int. Cl.³ .............................................. B65H 75/02
[52] U.S. Cl. .................................... 242/68.5; 242/68; 242/71
[58] Field of Search ................. 242/68, 68.5, 71, 71.2, 242/73.5

[56] References Cited

U.S. PATENT DOCUMENTS

| | | | |
|---|---|---|---|
| 670,683 | 3/1901 | Moore | 242/71 X |
| 1,055,576 | 3/1913 | Tyler et al. | 242/68.5 |
| 1,068,895 | 7/1913 | Harper | 354/159 |
| 1,260,898 | 3/1918 | Harrell | 242/71 |
| 1,362,397 | 12/1920 | Colter et al. | 242/71 |
| 1,479,253 | 1/1924 | Rivetta | 242/71 |
| 1,482,339 | 1/1924 | Abeles | 242/71 |
| 4,129,266 | 12/1978 | Masiello | 242/68.5 X |
| 4,191,342 | 3/1980 | Reinhold | 242/68.5 X |

*Primary Examiner*—John Petrakes
*Attorney, Agent, or Firm*—Albert F. Kronman

[57] ABSTRACT

A combined mandrel and core assembly for a camera in which an elongated, cylindrical hollow core, upon which a roll of photosensitive material is carried, is supported by a cylindrical mandrel rotatably mounted within the camera. A spring loaded detent within a slot in the mandrel extends through the slot into a complimentary slot at the midpoint between the ends of the core. The mandrel slot is precisely located upon the longitudinal optical axis of the camera's image plane. The core and its photosensitive material are thereby quickly and accurately positioned along said optical axis. Different widths of photosensitive material may be used upon the same mandrel.

6 Claims, 4 Drawing Figures

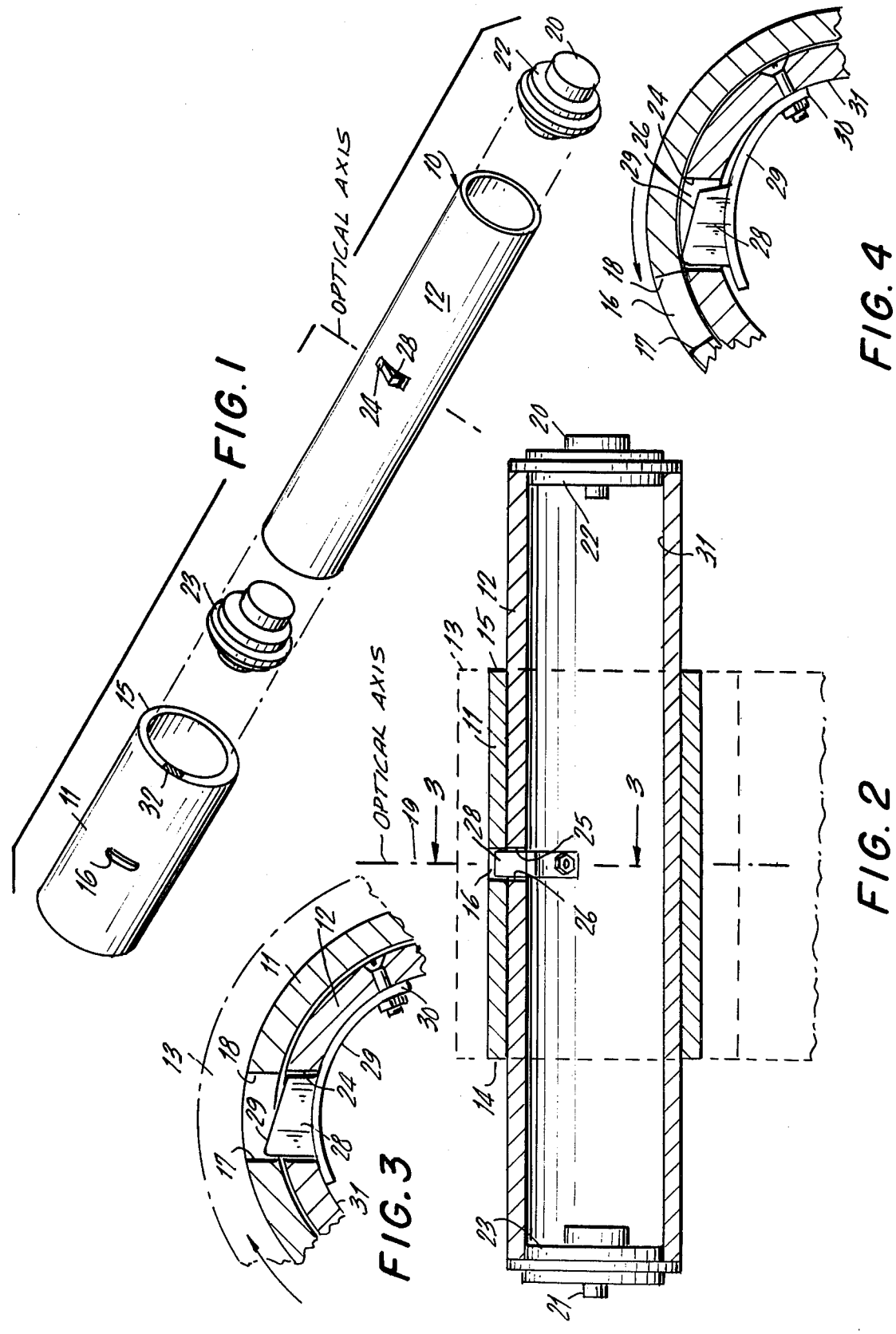

MANDREL AND CORE ASSEMBLY FOR LARGE FORMAT CAMERAS

BACKGROUND OF THE INVENTION

Large format cameras such as are used commercially frequently use rolls of photosensitive material for imaging. The photosensitive material is led from the rolls on to the image plane of the camera for exposure to light from the object to be copied, traversing the camera lens. Movement is imparted to the photosensitive material by means of rollers which guide it into position for exposure. In handling the photosensitive material it is essential that it is not skewed or deflected as it is advanced through the camera. It is also important that the material is located so that its longitudinal axis coincides with the longitudinal centerline of the image plane of the camera.

Many cameras employ rolls of photosensitive material of different widths for different imaging purposes. Changing from one width size to another in prior art devices requires substantial camera adjustment and centering.

Accordingly, it is an object of the present invention to provide a combined mandrel and core assembly for rolls of photosensitive material useful in large format cameras.

Another object of the present invention is to provide a combined mandrel and core assembly which will insure the proper axial alignment of the photosensitive material within the camera.

A further object of the present invention is to provide a combined mandrel and core assembly which will permit easy and accurate use of different width rolls of photosensitive material within a large format camera.

Still another object of the present invention is to provide a simple inexpensive structure for mounting and aligning rolls of photosensitive material within a camera.

SUMMARY

The combined mandrel and core assembly according to the present invention comprises an elongated hollow core to receive rolled photosensitive material thereon, and a hollow mandrel, journaled within the camera, to receive the hollow core. The mandrel is provided with a spring loaded detent located at the midpoint between its ends, which detent projects through the mandrel wall and into a complimentary slot in the wall of the core. The core slot is located at the midpoint between the core ends so that the core, when engaged by the detent, is centered upon the mandrel for any length of core.

BRIEF DESCRIPTION OF THE DRAWING

In the accompanying drawing forming part hereof, similar parts have been given the same reference numerals, in which drawing;

FIG. 1 is a somewhat isometric, exploded view of a complete embodiment of the present invention.

FIG. 2 is a longitudinal view partly in cross section of the assembled embodiment of FIG. 1.

FIG. 3 is a fragmentary cross sectional view taken on Line 3—3 in FIG. 2, on an enlarged scale.

FIG. 4 is a view similar to FIG. 3 showing the mandrel and core assembly in an uncoupled position.

DETAILED DESCRIPTION

Referring to the drawing, 10 indicates a combined mandrel and core assembly having an elongated, hollow, cylindrical core 11 and an elongated, hollow, tubular mandrel 12. The outside diameter of the mandrel is of a size to freely receive the inside diameter of the core thereon.

The core 11 may be made of any suitable rigid material such as plastic, compressed paper or metal. The mandrel 12 is preferably made of metal such as aluminum or steel. The core 11 is of sufficient length to receive an elongated strip of photosensitive material such as a web of paper coated with any of the well-known image forming substances used in the graphic arts. The elongated strip is wound upon the core 11 to form a roll as indicated in dashed lines 13 in FIGS. 2 and 3. While the length of the core 11 is preferably coextensive with the width of the roll 13 it may be longer or shorter if desired.

Midway between the ends 14, 15 of the core 11 there is very accurately positioned a rectangular slot 16, the side walls 17,18 of which are equidistant from the centerline 19 of the core. The slot 16 may penetrate the core body as shown in the drawing or, if the core is sufficiently thick, the slot may be closed at tis upper end by a wall (not shown).

The mandrel 12 is rotatably carried within the camera (not shown) by stub shafts 20, 21 releasably secured within camera bearings (not shown) in the well-known manner (the mandrel must be positioned within the camera so that its centerline coincides with the longitudinal centerline of the image plane or optical axis). The stub shafts 20, 21 may be integral with end caps 22, 23 as shown in FIGS. 1 and 2. The end caps 22, 23 are press fitted into the mandrel 12. It will be noted from an examination of FIG. 2 that the end caps 22, 23 have an outside diameter equal to that of the mandrel 12 so that the core 11 can be slipped over one of the end caps and on to the outer surface of the mandrel 12. It is important that the mandrel 12 be properly oriented within the camera so that the detent 28 (hereinafter more fully described) is properly positioned. In order to insure proper orientation of the mandrel 12, the stub shafts 20, 21 are made of different diameters so that they will only fit in their proper camera bearing sockets (not shown).

A second rectangular slot 24 is cut through the body of the mandrel 12 as shown in the drawings. The second slot is also precisely positioned so that its side walls 25,26 are equidistant from the centerline or optical axis 27 of the mandrel 12 (see FIG. 1).

Within the second slot 24 there is provided a detent 28 which is urged outwardly of the slot by a flat spring 29 secured at one end 30 to the inner wall 31 of the mandrel 12. The detent is formed with opposed, flat sides which engage the sides 17, 18 of the core slot 16 thereby locating and securing the core on the longitudinal axis of the camera which, in turn, is the longitudinal optical axis of the image plane of the camera.

The detent 28 is provided with a ramp 29 at the outer or top thereof as best shown in FIGS. 3 and 4. The high point of the ramp 29, which extends into the slot 16 of the core 11, faces away from the direction of the travel of the photosensitive material. In this manner, the detent acts to prevent rotation of the core with respect to the mandrel when in use.

From the above description it will be apparent that when it is desired to place a roll of photosensitive material precisely on the centerline of the camera for travel into the camera, it is merely necessary for the operator to lift the mandrel 12 out of the camera, depress the spring loaded detent 28 until it is below the outer surface of the mandrel 12 and then slide the core 11 along the mandrel until it passes over the detent 28. The detent is then released and will snap into the rectangular slot 16 when the said slot comes into register with the detent as shown in FIG. 3. A small locating mark 32 will aid the operator in aligning the rectangular slot 16 with the detent 28.

In order to remove the core 11, the operator can rotate the core 11 slightly upon the mandrel 12 as indicated by the arrow in FIG. 4, thereby depressing the detent 28 and permitting the removal of the core 11.

Having thus fully described the invention what is claimed and desired to be secured by Letters Patent, is:

1. A mandrel and core assembly for supporting rolls of photosensitive material within a camera comprising an elongated, cylindrical mandrel, means at each end of said mandrel to rotatably secure it within the camera, a first slot in the mandrel located between the ends of the mandrel, normal to the longitudinal axis of the mandrel, and upon the longitudinal optical axis of the image plane of the camera, a detent yieldably carried by the mandrel within the first slot extending through the said slot and beyond the outer surface of the mandrel, an elongated, hollow core, said core having a cylindrical core body adopted to carry a roll of photosensitive material thereon and slidably receivable upon the mandrel, and a second slot in the core body midway between the ends thereof of a size to receive the detent therein to couple the core and mandrel together.

2. An assembly according to claim 1 in which the securing means at each end of the mandrel comprises a first and a second stub shaft of unequal diameters.

3. An assembly according to claim 2 in which the shafts are formed integral with end caps received within the mandrel ends.

4. An assembly according to claim 1 in which the detent is spring loaded to project from the surface of the mandrel.

5. An assembly according to claim 4 in which the sides of the detent are substantially plannar and disposed normal to the longitudinal axis of the mandrel.

6. An assembly according to claim 1 in which the detent is formed with a ramp portion at the outer portion thereof, said ramp having its high portion facing in a direction opposite the direction of travel of the photosensitive material.

* * * * *